United States Patent Office 2,864,774

Patented Dec. 16, 1958

2,864,774

PROCESS OF PRODUCING ELECTRICALLY CONDUCTIVE PLASTIC

Preston Robinson, Williamstown, Mass., assignor to Sprague Electric Company, North Adams, Mass., a corporation of Massachusetts No Drawing. Application April 29, 1953
Serial No. 352,062

5 Claims. (Cl. 252—514)

The present invention relates to a new type of conductive resinous material.

In the prior art, numerous resinous compositions have been made conductive by a physical intermixture of rather large particles capable of carrying an electric current. These particles have been finely divided materials, such as, for example, silver, carbon, or the like. The prior art conductive plastics as indicated are limited severely in their properties due to the inherent natures of the specific conductive particles employed. In effect, the art of producing resins filled with conductive materials of any type is more empirical than scientific at the present time, and the properties of the conductive mixtures obtained frequently vary from one batch to another without any apparent reason.

It is an object of the instant invention to produce a new type of conductive mixture which overcomes many of the disadvantages of the prior art. A further object is to produce a resin filled conductive composition which can be readily molded into various shapes for applications in electrical work. A further object of the invention is to establish a process for the production of uniform resin filled conductive compositions. These and further objects of the invention, as well as the advantages of it, will be apparent from the body of this specification, as well as the appended claims.

Broadly, the above objects are attained by the in situ formation of cryptocrystalline metallic particles within a resin composition as it itself is being molded under conditions of elevated heat and pressure, these metal particles being formed by the reduction of a metal salt by an aldehyde during molding.

The preferred resins normally used with the invention are those in which an aldehyde forms an essential component. The common resins preferred are those of phenol, urea, or melamine condensed with formaldehyde, although other aldehydes, such as, for example, furfural or glyoxal can be employed. Similarly, other specific non-aldehyde components, such as, for example, various cresol fractions or compounds closely related to urea or melamine can also be used with the present invention.

A large number of metal salts can easily be reduced to a cryptocrystalline state during the molding of an aldehyde resin as indicated above. The preferred metal salts are those of silver—specifically, silver chloride, silver bromide, and silver fluoride—although other silver salts, such as, for example, silver nitrate, silver sulphate, etc. can be used. A preferred group of metal salts consist of the salts of noble metals, specifically gold, platinum, and mercury, and halide acids. Broadly, any metal salt capable of reduction by an aldehyde under the temperature and pressure conditions employed can be used to produce cryptocrystalline metal.

This term cryptocrystalline as used herein is a distinguishing feature of the instant invention. It designates commonly finely divided metal, the presence of which as a rule cannot be determined by examination under a common, relatively low powered microscope. Particles of the size range produced in accordance with the invention cannot be separated upon any standard screen, and further, are much smaller than any particles hitherto normally incorporated within the prior art conductive resinous compositions. It is possible to incorporate with the new conductive materials many of the prior art conductive particles, such as, for example, carbon silver, finely divided silver, or the like, but such incorporation tends to detract from the properties of the new resinous compositions obtained in accordance with the teachings of this specification.

Conventional molding conditions are normally employed in forming these new compositions. With phenolic resins, pressures of from 2,000 to 8,000 p. s. i., together with temperatures of from 280 to 360° F. produce quite satisfactory compositions containing cryptocrystalline metals. Urea-containing resins are normally molded at from 1500 to 6,000 p. s. i. at temperatures of from 290 to 325° F. Melamine containing resins are similarly normally molded at pressures of from 1500 to 6,000 p. s. i. at temperatures of from 300 to 330° F. Satisfactory cryptocrystalline containing moldings are obtained under any of these molding conditions provided a sufficient amount of aldehyde is used to reduce the metal salts present. In general, the amount of aldehyde added for reduction of metal salts is calculated upon the amount of metal desired in the final composition, and this, in turn, depends upon the quantity of metal salt incorporated within the resin prior to the final curing step. Neither the metal salt nor the aldehyde should be present in any excess of an amount of about 20% as too great an excess of either item is apt to substantially alter the final properties of the resin. In order that optimum characteristics are obtained and the cryptocrystalline characteristic of the metal in the final molding is not materially altered, this metal should not be more than 20% by weight of the total resin-conductive particle composition produced. Too high a proportion of cryptocrystalline metal, as well as too long a molding time, tends to agglomerate the cryptocrystalline particles created into what can be termed micro particles having the characteristics of more conventional conductive particles. Any of the standard molding times up to about 10 minutes are acceptable with the instant invention.

Many of the common catalysts normally employed in the industry can be satisfactorily used with resins in the production of cryptocrystalline metal-resin compositions as specified herein. Frequently, some adjustment in conventional resin compositions must be made in order to compensate for the presence of ionic metal salts. These salts themselves can frequently serve as catalysts. Any of the common filter materials employed with the industry can also be incorporated within the resinous compositions of the invention, although they lower the conductivity of the final products obtained. Suitable mineral materials are diatomaceous earth, talc, slate, asbestos, mica, graphite, barites, or the like. Cellulose materials, such as, for example, cotton linters, wood flour, paper pulp, etc. can also be used. Also, known plasticizers and extenders, such as, for example, natural resin, fatty acids, glycerol, lignin preparations, and rosin products can also be used, although their use is not always favored.

It is to be understood that the common steps normally employed in forming any of the condensation resins specifically enumerated are not changed in forming molding compositions which can be used to produce cryptocrystalline material-resin products in accordance with the present invention. Normally, all of the resinous materials enumerated are first partially polymerized, then are intermixed with the metal salts indicated, as well as an "excess" of an aldehyde, as well as other ingredients as known to the industry, and then are finely molded using established injection techniques. If desired, metal salts, as well as the extra aldehyde, can be present from the start of the reaction forming a resinous material. Frequently, when this is the case, some cryptocrystalline metal is present within the intermediate resin composition.

Those skilled in the art will realize that the instant inventive concept is capable of modification. Insofar as such modifications are within the skill of the art and are encompassed by the scope of the appended claims, they are to be considered as part of the present invention. In order that this specification may be complete under the Rules of Practice of the U. S. Patent Office, the following specific examples of the formation of the new conductive plastics of the instant invention are given. These examples are not to be considered as limiting in any respect.

*Example 1*

2 parts formaldehyde was admixed with 1 part phenol and 0.01 part of sulfuric acid catalyst and 0.4 part of silver chloride, all parts being by weight. The mixture was stirred together and heated sufficiently to start the reaction between the ingredients. This resinification proceeded without the aid of further external heating. At the end of 30 minutes, the batch was cooled, vacuum dried, and poured out of the reaction vessel. It was then admixed with an equal weight of cotton linters, and both ingredients were milled together on rolls, such as commonly used in the rubber industry which were heated to a temperature of about 200° F. The blended batch was then ground to a uniform particle size (100 mesh) and injection molded at a temperature of 320° F. under a pressure of 4,000 lbs. p. s. i. into a plurality of small conductive rods about ⅛ inch in diameter and 2 inches long. Cryptocrystalline metal was produced in all of these rods by the final molding step.

*Example 2*

1 mol. of urea was reacted with 1.5 mol. of formaldehyde in a 40% aqueous solution in the presence of triethanolamine at 45° F. At the end of one hour, the water soluble product thus formed was cooled, filtered, and acidified to the pH of about 6.5. At this point, talc in an amount equal to ⅔ of the weight of the resin product was added to it, together with ½ mol. of silver nitrate and a stoichiometric amount of formaldehyde. The ingredients were mixed together, dried under reduced pressure at a temperature of 70° F. so as to produce the so-called resin "pop corn." At this point, dimethyl oxalate was added as a latent catalyst, and the entire mixture was then molded at a temperature of 2,000 p. s. i. gauge temperature 310° F. into rods of electrically conductive plastic as indicated in the pervious example.

*Example 3*

The same procedure was followed as in Example 2 above, except that the final condensation was carried out at pH of 7, and melamine was used in place of urea.

What is claimed is:

1. A process for producing cryptocrystalline metal with a resinous composition which comprises admixing a noble metal salt in a proportion of 20% by weight of the total composition, a resinous condensation product of an aldehyde with a member of the group consisting of phenol, urea and melamine, said condensation product being capable of undergoing further polymerization and an excess of the aldehyde in a proportion of not more than 20% by weight of the total composition and molding the said mixture under conditions of elevated temperature in the range of 300 to 330° F. and pressure of from about 1500 to 6000 p. s. i. for a period of up to 10 minutes so as to produce a rigid composition in which said metal salt is reduced to cryptocrystalline metal particles by said aldehyde, the amount of metal salt in an aldehyde being such as to have the cryptocrystalline particles impart electrical conductivity to the molded product.

2. A process for producing a new and improved resinous composition containing cryptocrystalline noble metal particles which comprises admixing a phenol formaldehyde resinous molding composition with an excess of formaldehyde in a proportion of not more than 20% by weight of the total resin and a noble metal salt in a proportion of not more than 20% by weight of the total resin, and molding said composition at a pressure of from about 2,000 to about 8,000 p. s. i. at a temperature of from 280 to 360° F., the amount of metal salt and aldehyde being such as to have the cryptocrystalline particles impart electrical conductivity to the molded product.

3. A process for producing a new and improved conductive resinous composition containing cryptocrystalline noble metal composition which comprises admixing a urea formaldehyde molding composition with a noble metal salt in a proportion of not more than 20% by weight of the total composition and an excess of formaldehyde in a proportion of not more than 20% by weight of the total composition, and molding said composition at from about 1500 to about 6,000 p. s. i. at a temperature of from about 290 to about 325° F., whereby said metal salt is reduced by said formaldehyde to cryptocrysalline metal particles the amount of metal salt and formaldehyde being such as to have the cryptocrystalline particles impart electrical conductivity to the molded product.

4. A process for producing a new and improved conductive resinous composition containing cryptocrystalline noble metal composition which comprises admixing a melamine formaldehyde molding composition with a noble metal salt in a proportion of not more than 20% by weight of the total composition and an excess of formaldehyde in a proportion of not more than 20% by weight of the total composition, and molding said composition at from about 1500 to about 6,000 p. s. i. at a temperature of from about 290 to about 325° F., whereby said metal salt is reduced by said formaldehyde to cryptocrystalline metal particles the amount of metal salt and formaldehyde being such as to have the cryptocrystalline particles impart electrical conductivity to the molded product.

5. A process for producing an electrically conductive resin containing cryptocrystalline silver particles which comprises admixing a silver salt in a proportion of not more than 20% by weight of the total resin, a formaldehyde containing resinous composition capable of further polymerization and an excess of the formaldehyde in a proportion of not more than 20% by weight of the total resin, and molding said mixture under conditions of elevated temperature in the range of 300 to 330° F. and pressure in the range of from 1500 to 6000 p. s. i. whereby said silver salt is reduced to cryptocrystalline silver, the amount of silver salt and formaldehyde being such that the molded product is electrically conductive.

References Cited in the file of this patent

UNITED STATES PATENTS

| | | |
|---|---|---|
| 2,434,190 | Barnes et al. | Jan. 6, 1948 |
| 2,721,357 | Hachberg | Oct. 25, 1955 |

OTHER REFERENCES

Weiser: "Colloid Chemistry," 2nd edition, 1949, pages 141–142.

UNITED STATES PATENT OFFICE

CERTIFICATE OF CORRECTION

Patent No. 2,864,774 December 16, 1958

Preston Robinson

It is hereby certified that error appears in the printed specification of the above numbered patent requiring correction and that the said Letters Patent should read as corrected below.

Column 2, line 52, for "filter" read -- filler --.

Signed and sealed this 19th day of May 1959.

(SEAL)

Attest:

KARL H. AXLINE

Attesting Officer

ROBERT C. WATSON

Commissioner of Patents